US010225775B2

(12) United States Patent
Townend

(10) Patent No.: US 10,225,775 B2
(45) Date of Patent: Mar. 5, 2019

(54) ACCESS POINT SELECTION IN A WIRELESS NETWORK

(71) Applicant: BRITISH TELECOMMUNICATIONS public limited company, London (GB)

(72) Inventor: David Paul Townend, London (GB)

(73) Assignee: British Telecommunications Public Limited Company, London (GB)

(*) Notice: Subject to any disclaimer, the term of this patent is extended or adjusted under 35 U.S.C. 154(b) by 165 days.

(21) Appl. No.: 14/781,005

(22) PCT Filed: Mar. 27, 2014

(86) PCT No.: PCT/GB2014/000122
§ 371 (c)(1),
(2) Date: Sep. 28, 2015

(87) PCT Pub. No.: WO2014/155044
PCT Pub. Date: Oct. 2, 2014

(65) Prior Publication Data
US 2016/0066227 A1 Mar. 3, 2016

(30) Foreign Application Priority Data

Mar. 28, 2013 (EP) ..................... 13250043

(51) Int. Cl.
*H04L 5/00* (2006.01)
*H04W 36/00* (2009.01)
(Continued)

(52) U.S. Cl.
CPC ........... *H04W 36/08* (2013.01); *H04L 5/0048* (2013.01); *H04W 36/0083* (2013.01);
(Continued)

(58) Field of Classification Search
CPC . H04W 36/30; H04W 36/08; H04W 36/0083; H04B 17/318; H04B 17/382
See application file for complete search history.

(56) References Cited

U.S. PATENT DOCUMENTS

2002/0165563 A1* 11/2002 Grant ................... A61B 17/072
606/151
2004/0165563 A1* 8/2004 Hsu ....................... H04W 48/18
370/338
(Continued)

FOREIGN PATENT DOCUMENTS

EP 2 424 281 A1 2/2012

OTHER PUBLICATIONS

PCT International Search Report for PCT/GB2014/000122, dated May 6, 2014, 3 pages.
(Continued)

*Primary Examiner* — Ayaz R Sheikh
*Assistant Examiner* — Debebe A Asefa
(74) *Attorney, Agent, or Firm* — Amy M. Salmela; Patterson Thuente Pedersen, P.A.

(57) ABSTRACT

In a wireless network such as Wi-Fi, a wireless access point connected to a client device monitors the quality of the link to the client device. When the client device sends probe frames indicative of the link to the connected access point being too low for continued data connectivity, the access points forwards connection data to a management server. When other access points receive the probe requests, they consult the management server to obtain the low channel quality data and use it as a threshold for determining whether to respond to the client device's probe request.

13 Claims, 17 Drawing Sheets

(51) Int. Cl.
  *H04W 36/08* (2009.01)
  *H04W 48/16* (2009.01)
  *H04W 48/20* (2009.01)
  *H04W 76/10* (2018.01)

(52) U.S. Cl.
  CPC .......... *H04W 48/20* (2013.01); *H04W 76/10* (2018.02); *H04W 48/16* (2013.01)

(56) References Cited

U.S. PATENT DOCUMENTS

| | | | |
|---|---|---|---|
| 2005/0047343 | A1 | 3/2005 | Sharony et al. |
| 2005/0271009 | A1* | 12/2005 | Shirakabe ............. H04W 16/10 370/329 |
| 2006/0146709 | A1 | 7/2006 | Ginzburg |
| 2007/0124478 | A1 | 5/2007 | Ahdelhamid et al. |
| 2007/0291711 | A1 | 12/2007 | Welch et al. |
| 2008/0080387 | A1 | 4/2008 | Wang et al. |
| 2008/0080388 | A1 | 4/2008 | Dean et al. |
| 2008/0117836 | A1 | 5/2008 | Savoor et al. |
| 2008/0151751 | A1 | 6/2008 | Ponnuswamy et al. |
| 2010/0080196 | A1 | 4/2010 | Ho et al. |
| 2011/0243013 | A1 | 10/2011 | Lee et al. |
| 2011/0305180 | A1* | 12/2011 | Osterling ............ H04W 74/006 370/311 |
| 2012/0224484 | A1 | 9/2012 | Babiarz et al. |
| 2012/0314571 | A1 | 12/2012 | Forssell |
| 2013/0295989 | A1 | 11/2013 | Smadi et al. |
| 2016/0043953 | A1 | 2/2016 | Ringland et al. |
| 2016/0057290 | A1 | 2/2016 | Punwani et al. |
| 2017/0006504 | A1 | 1/2017 | Townend et al. |

OTHER PUBLICATIONS

International Search Report, for PCT Application No. PCT/GB2014/053705, dated Mar. 9, 2015, 2 pages.
Romdhani et al., Adaptive EDCF: Enhanced Service Differentiation for IEEE 802.11 Wireless Ad-Hoc Networks, Sophia Antipolis, France, 2004, 6 pages.
Veres et al, "Supporting Service Differentiation in Wireless Packet Networks Using Distributed Control", IEEE, vol. 19, No. 10, Oct. 2001, 13 pages.
Hwee et al., "A Unified Qos-Inspired Load Optimization Framework for Mulitple Access Points Based Wireless LANs", IEEE, May 2009, 7 pages.
Wikipedia, "Distributed Coordination Function", retrieved Sep. 28, 2015, 2 pages.
Wikipedia, "IEEE 802.11e-2005", retrieved Sep. 28, 2015, 4 pages.
BT, "BT Wi-Fi", retrieved Sep. 28, 2015, 2 pages.
ServerFault, "Huge Outgoing Traffic on Windows Azure" retrieved Sep. 28, 2015, 2 pages.
International Search Report, for PCT Application No. PCT/GB2014/000123, dated May 6, 2014, 4 pages.
Application and File History for U.S. Appl. No. 15/104,283, filed Jun. 14, 2016. Inventors: Townend et al.
Application and File History for U.S. Appl. No. 14/780,990, filed Sep. 28, 2015. Inventors: Ringland et al.
Mustafa, Ahsan, & Ibrahim; Pre-Scanning and Dynamic Caching for Fast Handoff at MAC Layer in IEEE 802.11 Wireless LANs; NUST University Rawalpindi, Pakistan; 8 pages.
Bhadane, Waoo, Patheja; Improving Fast and Smooth Handoff in IEEE 802.11 Wireless Networks; IJRIM vol. 2, Issue 2 (Feb. 2012) (ISSN 2231-4334); 9 pages.

* cited by examiner

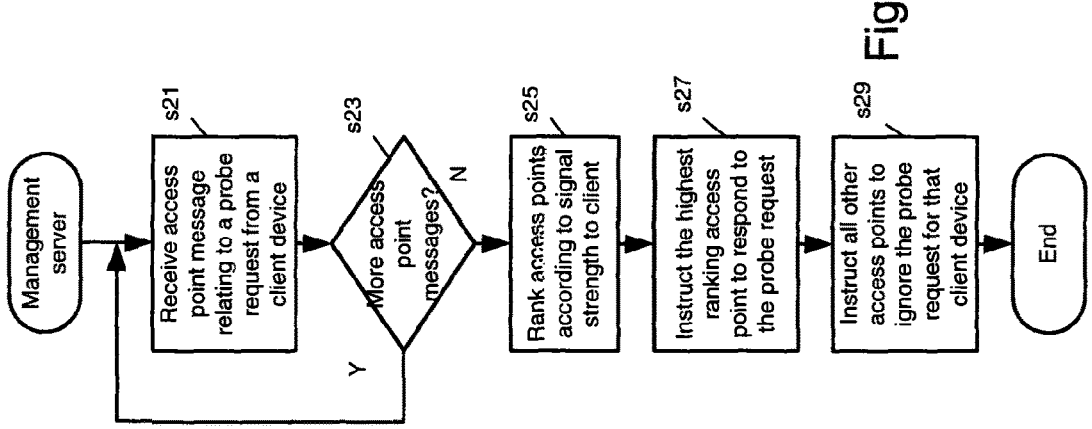

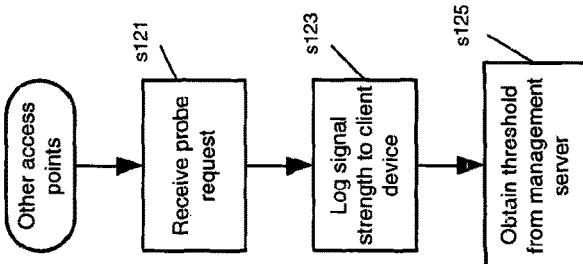
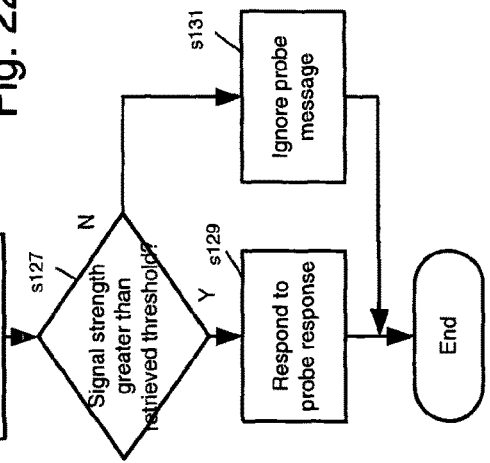
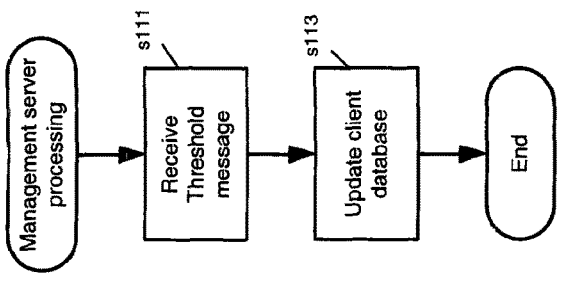
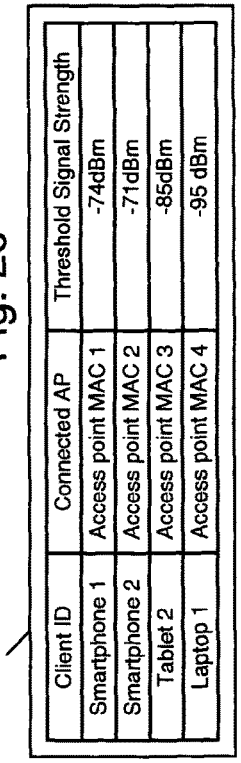

ACCESS POINT SELECTION IN A WIRELESS NETWORK

RELATED APPLICATIONS

The present application is a National Phase entry of PCT Application No. PCT/GB2014/000122, filed Mar. 27, 2014, which claims priority to EP 13250043.0, filed Mar. 27, 2014, the contents of which are incorporated herein by reference in their entireties.

TECHNICAL FIELD

Embodiments relate to wireless network access and in particular to a method of controlling access to a wireless network by controlling the responses of access points to the presence of client devices.

BACKGROUND

In contrast to traditional wired networks in which computing devices are physically linked via copper or optical cables, wireless networks rely on radio frequency waves transmitted across an air medium.

Standards for controlling the behavior of such example wireless networks include the "Wi-Fi" family of standards currently defined in IEEE 802.11a, IEEE 802.11b, IEEE 802.11g, IEEE 802.11n and IEEE 802.11ac protocol.

In Wi-Fi networks, the network is created using a device known as an access point (AP). The access point transmits and receives radio frequency signals in specific frequency ranges called channels within the 2.4 GHz and 5 GHz spectrum or any other supported radio bands. For example, in 802.11g and 2.4 GHz 802.11n there are thirteen 20 MHz channels with a 5 MHz separation, with channel 1 centered at 2412 MHz and channel 13 centered at 2472 MHz. Devices such as smartphones, personal computers and tablet device which are compatible with the protocol used by the access point can join the network via an authentication and association process.

The access point is often paired to a router or modem hardware which is linked to a wide area network such as the Internet. It therefore functions as a bridge between the created wireless network and a wired network such as the Internet or a corporate network.

The benefit of a wireless network is that client devices do not have to be attached to the access point by a wire to gain connectivity to a wider area network, furthermore the devices can move while still maintaining connectivity. Due to the nature of the radio frequency signals and antenna properties, the wireless network created by an access point extends into the surrounding area, typically between 50 m indoors and 100 m outdoors under ideal conditions. Although the signal strength deteriorates as the distance from the access point increases and/or as the number of obstructions increases, so as to reduce these ranges in most cases, this degree of mobility provides flexibility to the client devices.

Due to the limited range of each access point and the availability of multiple frequency channels, it is common for many wireless networks to be present in any given area. By selecting different channels, the interference can be minimized. In some cases, each network is a private network and therefore each one will be secured with a pre-shared key security protocol such as Wi-Fi Protected Access version 2 (WPA2). It is also known to create hotspot networks such as the BT Wi-Fi network in which many access points are located across a large area and configured to appear as a single large area wireless network. In this case the access points within the hotspot network do not use any low level authentication since authorization onto the network is handled in the higher network layers using a protocol such as IEEE 802.1x or a web portal login.

Given that a wireless client device will often be within the connectivity range of multiple wireless networks, in order to determine which wireless networks are available, in accordance with the IEEE 802.11 family standards, a wireless device can perform a discovery process by sending a probe request frame on each available channel and wait for responses from any surrounding access points. This is shown in FIG. 1. Conventionally and as shown in FIG. 2, the access points are configured to respond to any probe messages with capability information and supported data rates. The client device will then process any received responses and present the list of networks to a user for manual selection. Once a network has been selected, then the standard authentication and association procedures are carried out until connectivity to the access point is established. Furthermore, the client device may remember access points it has previously connected to and when a known or "preferred" network is detected, it will automatically initiate the authentication and associated process without any action by the user.

Where there is a large number of access points, the number of probe request frames and probe responses can be very large. This reduces the bandwidth available for actual data traffic since only one device can be transmitting on a given channel at one time in accordance with the collision avoidance defined in Carrier Sense Multiple Access with Collision Avoidance (CSMA-CA) protocols. This is especially true in densely populated areas, or at large events such as sporting events.

SUMMARY

In one aspect, an embodiment provides a method of operating a wireless access point in a network of wireless access points and wireless communications devices, comprising: receiving a request for connectivity from a wireless communications device which is connected to another wireless access point; comparing a characteristic of the signal between the wireless access point and the wireless communications device against a predetermined threshold value associated with the wireless communications device; and responding to the request for connectivity only if the value of said signal characteristic exceeds the threshold.

In one aspect, an embodiment provides a method of operating a management device in a network having a plurality of wireless access points and a plurality of wireless communication devices, comprising: receiving signal characteristic information from at least a first wireless access point relating to a connected wireless communication device which is issuing connection requests to handover to another wireless access point; and determining a handover threshold value for the connected wireless communications device.

In one aspect, an embodiment provides a wireless access point device for, in use, forming part of a network of wireless access points and wireless communications devices, comprising: means for receiving a request for connectivity from a wireless communications device which is connected to another wireless access point; means for comparing a characteristic of the signal between the wireless access point and the wireless communications device against a predetermined threshold value associated with the wireless communications device; and means for responding to the request for connectivity only if the value of said signal characteristic exceeds the threshold.

In one aspect, an embodiment provides a management device in a network having a plurality of wireless access points and a plurality of wireless communication devices, comprising: means for receiving signal characteristic information from at least a first wireless access point relating to a connected wireless communication device which is issuing connection requests to handover to another wireless access point; and means for determining a handover threshold value for the connected wireless communications device.

In one aspect, an embodiment provides a computer program comprising instructions that when executed by a wireless access point control it to perform a method as disclosed herein.

In one aspect, an embodiment provides a computer program comprising instructions that when executed by a management device in a network, control it to perform a method as disclosed herein.

BRIEF DESCRIPTION OF THE DRAWINGS

Embodiments will now be described, by way of non-limiting example, with reference to the accompanying drawings, in which:

FIG. 11 is a flowchart showing the processing of the management server when an access point reports a new client device wishing to connect to a network in accordance with the first embodiment.

FIG. 12 is a schematic diagram of example contents of the client database in the management server in accordance with the first embodiment.

FIG. 19 is a flowchart showing the processing of the access point that a client device is connected to before handover in accordance with the second embodiment.

FIG. 20 is a flowchart showing the processing of the management server in the second embodiment.

FIG. 21 is a schematic diagram showing example contents of the client database in the second embodiment.

FIG. 22 is a flowchart showing the processing of other access points in the network which hear the client device's handover probe request frame in the second embodiment.

DETAILED DESCRIPTION

First Embodiment

Figure 1:
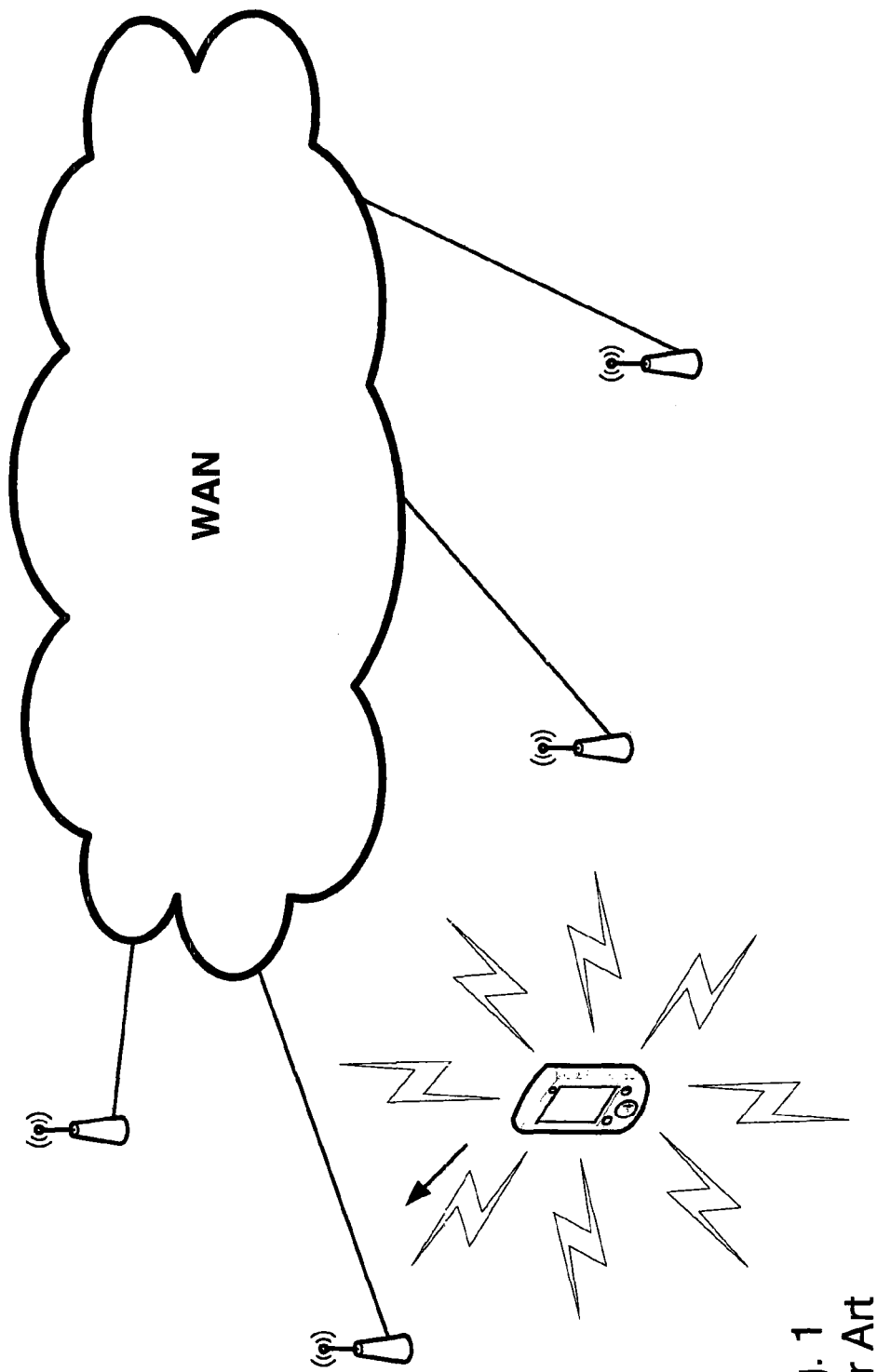
FIG. 1 is a schematic diagram of a prior art wireless network system in which a client device sends a probe message to a number of access points in the form of a broadcast message.
Figure 2:
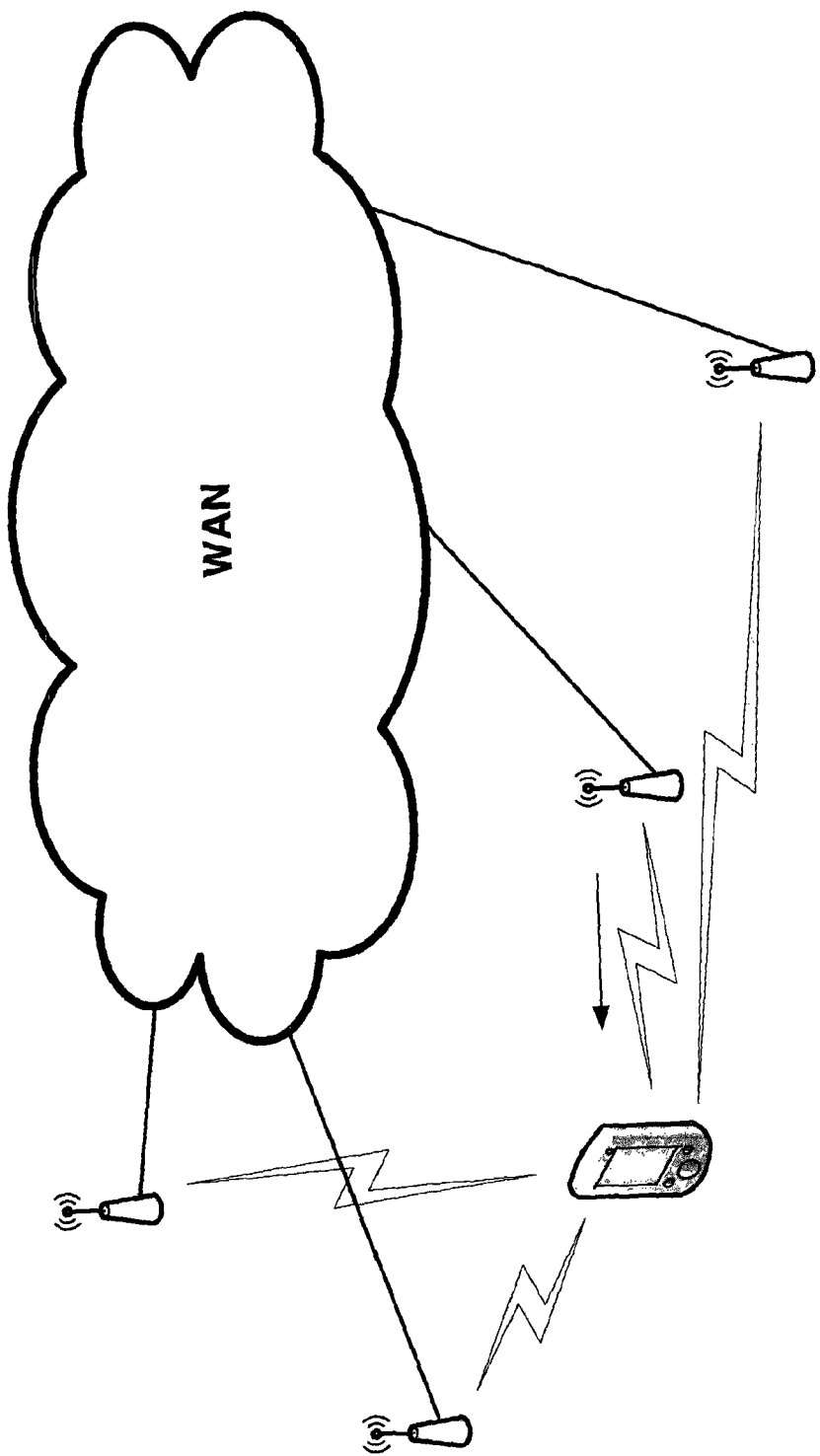
FIG. 2 is a schematic diagram of the wireless network system illustrated in FIG. 1 in which the access points respond to the probe request frame.
Figure 3:
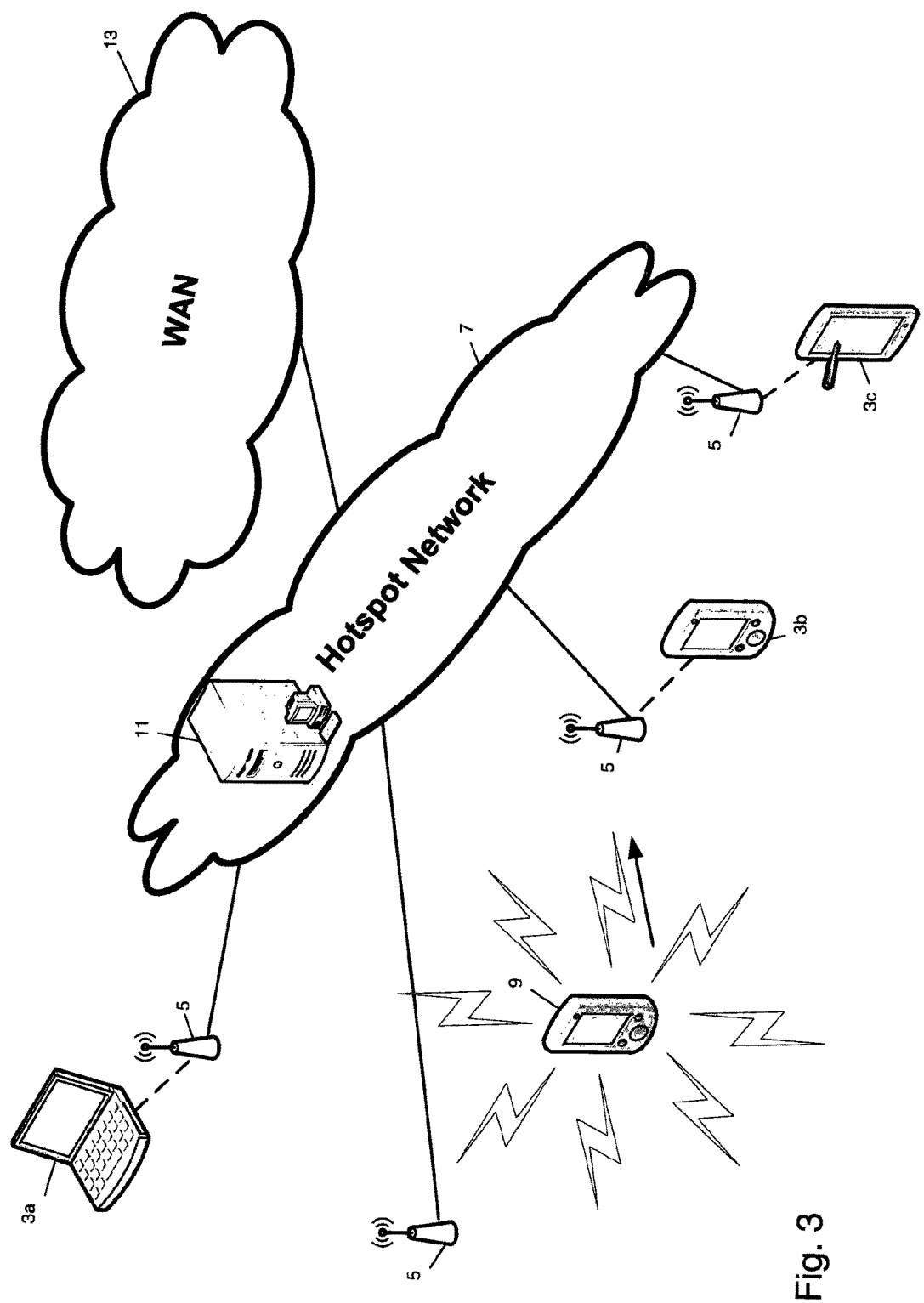
FIG. 3 is a schematic diagram of a wireless network system in accordance with a first embodiment in which a client device broadcasts a probe request frame and a number of access points are within range to hear the broadcast, each of which are connected to a management server.

FIG. 3 shows a network system in accordance with a first embodiment. The network 1 includes a number of wireless client devices 3 in the vicinity of a number of wireless access points 5 forming part of a hotspot network 7. Laptop 3a, smartphone 3b and tablet computer 3c are connected to some of the access points 5 while smartphone 9 is not yet connected. As is conventional, when a wireless client device 9 is not associated with a particular access point 5, it sends a probe message on the different wireless frequency channels and waits for at least one response. The surrounding wireless access points 5 hear the probe message. However, in the first embodiment, instead of immediately responding, they each forward the probe message and signal strength metrics to a network management server 11 via a wired connections.

In this embodiment, the access points 5 are linked and form part of the hotspot network 7 which handles user management and authentication, device behaviors and access to a wide area network such as the Internet 13.

Figure 4:
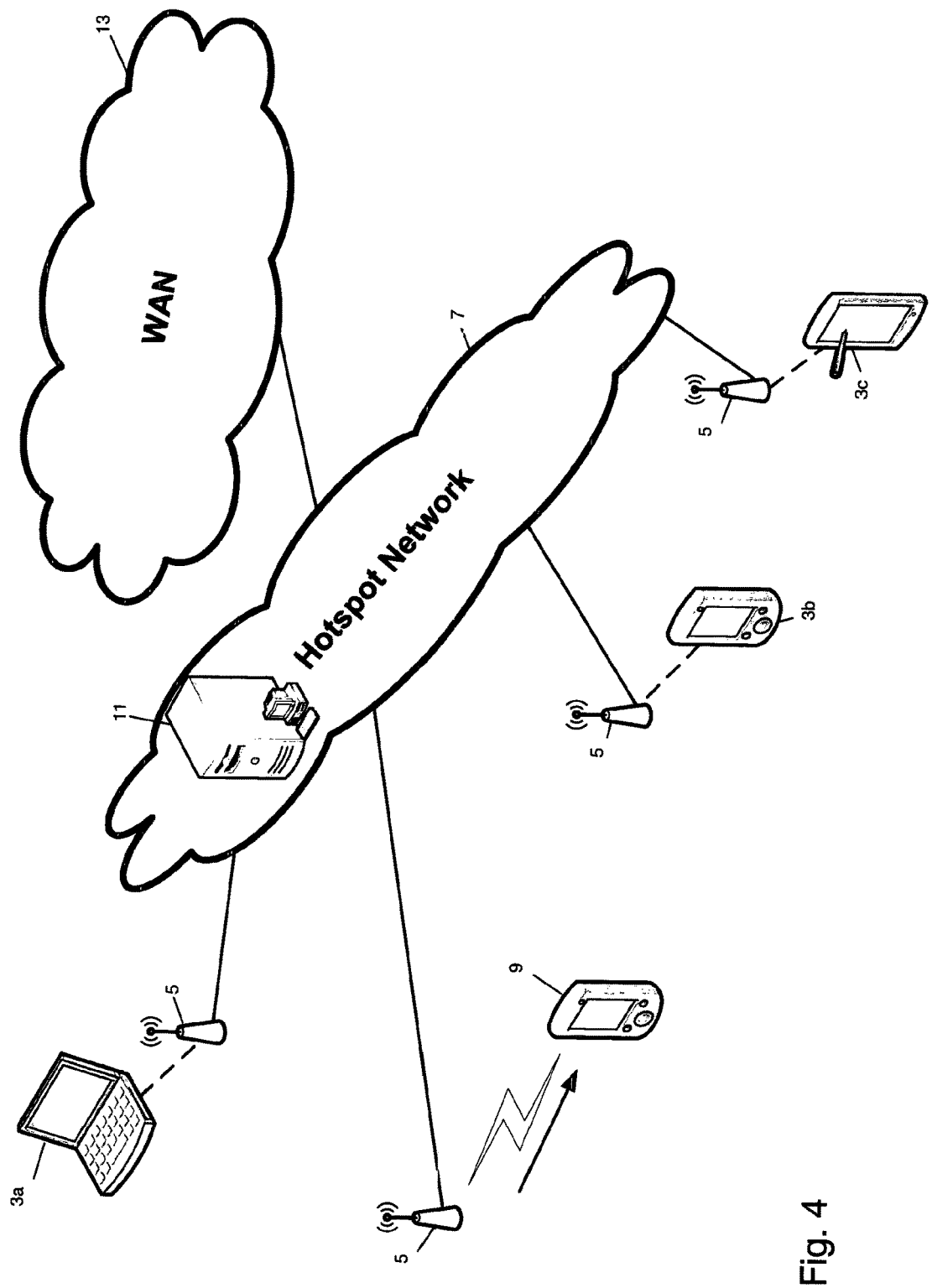
FIG. 4 is a schematic diagram of the wireless network system illustrated in FIG. 3 in which only one of the access points responds to the client device's probe request frame.

The management server 11 processes the forwarded probe requests in order to rank the access points and determine the best access point 5 that the client device 9 should connect to. It then selects the highest ranking access point 5 as the most suitable access point 5 for providing the client device 9 with connectivity and instructs only that access point to respond to the client device's 9 probe request. FIG. 4 shows a single access point 5 responding to the client device's probe request.

In this way, the volume of management data being transmitted in the wireless network is reduced, thereby providing more bandwidth for actual wireless data traffic.

The processing of the management server 11 to determine the best access point for connectivity corresponds to the processing that the wireless client device 9 would perform in a conventional system. However, by performing the selection at an earlier stage, the bandwidth usage is reduced without any modifications to the wireless client device behavior. It simply functions as though only a single wireless access point 5 is present in the vicinity.

Hardware

Figure 5:
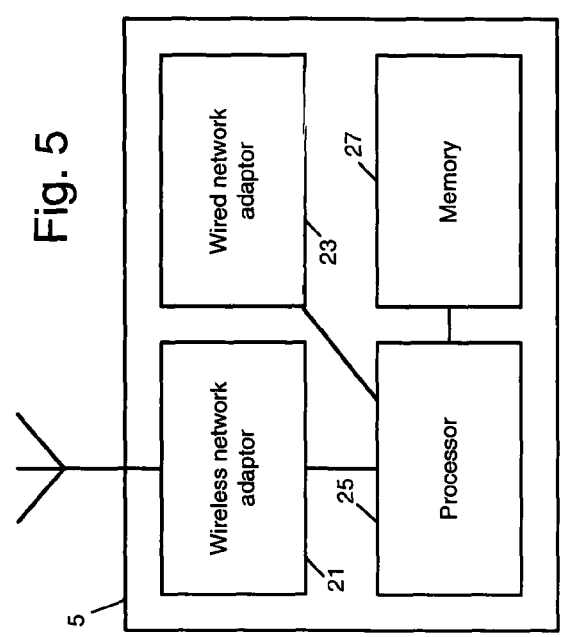
FIG. 5 is a schematic diagram of the main physical components of an access point illustrated in FIG. 3.

FIG. 5 shows the physical components of a wireless access point 5. The wireless access point 5 is responsible for providing a wireless local area network and routing any data traffic between the WLAN and a wired network such a corporate LAN, an Ethernet network or a wide area network such as the Internet 13.

The wireless access point 5 therefore contains a wireless network adaptor 21, a wired network adaptor 23, a processor 25 and memory 27.

Figure 6:
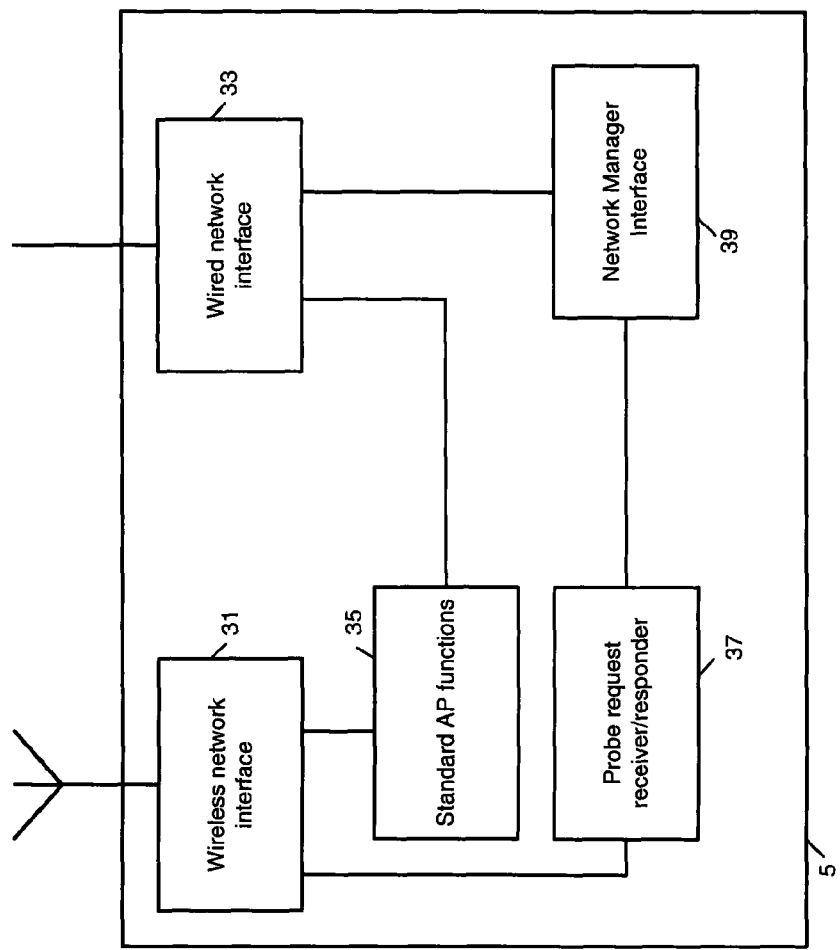
FIG. 6 is a schematic diagram of the functional components of the access point illustrated in FIG. 5.

When software instructions stored in the memory 27 are executed on the processor 25, the wireless access point 5 can be regarded as a number of functional units. FIG. 6 shows the main functional units of the wireless access point in accordance with the first embodiment.

The wireless access point includes a wireless network interface 31, a wired network interface 33 and standard access point functions 35 such as routing. Furthermore the access point 5 contains a modified probe request receiver and responder 37 and network manager interface 39. The operation of these further functions allows for a reduction in the volume of control data transmitted across the wireless network interface and will be explained in more detail later.

Figure 7:
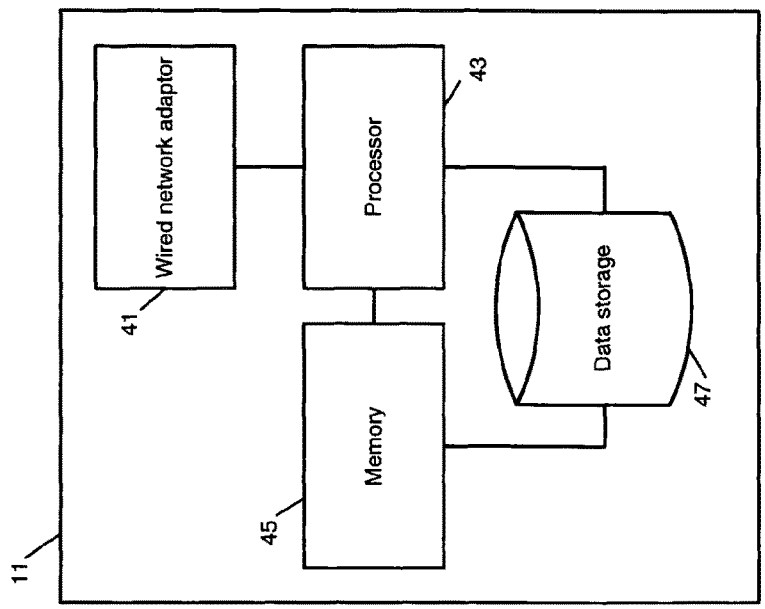
FIG. 7 is a schematic diagram of the physical components of the management server illustrated in FIG. 3.

FIG. 7 shows the physical components of the management server 11. The management server 11 contains a wired network adaptor 41, a processor 43, a memory 45 and a data store 47.

When data instructions stored in the memory 45 are executed on the processor 43 the management server functionality can be regarded as having a number of functional units.

Figure 8:
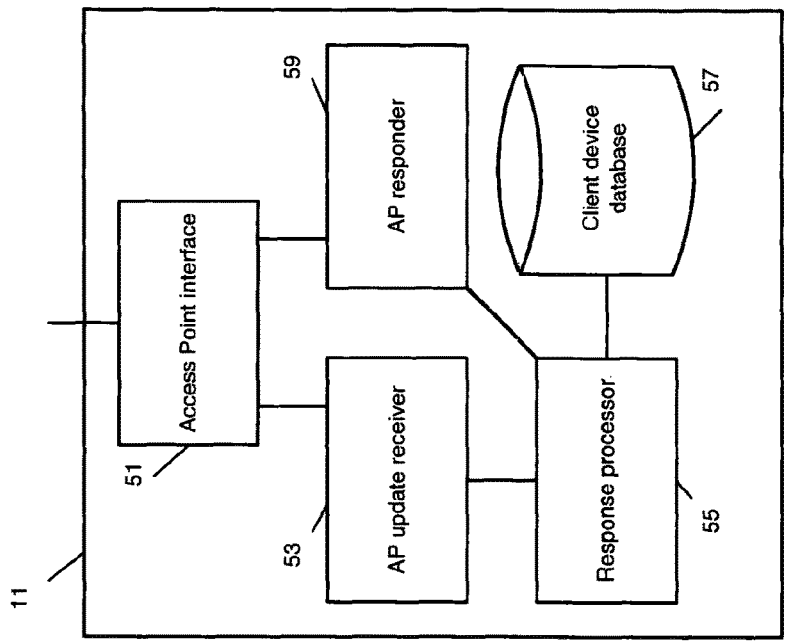
FIG. 8 is a schematic diagram of the functional components of the management server illustrated in FIG. 7.

FIG. 8 shows the functional units of the management server 11 in accordance with the first embodiment.

The functional units of the management server 11 include an access point interface 51, an access point update receiver 53, a response processor 55, a client device database 57 and an access point responder 59.

Processes

Figure 10:
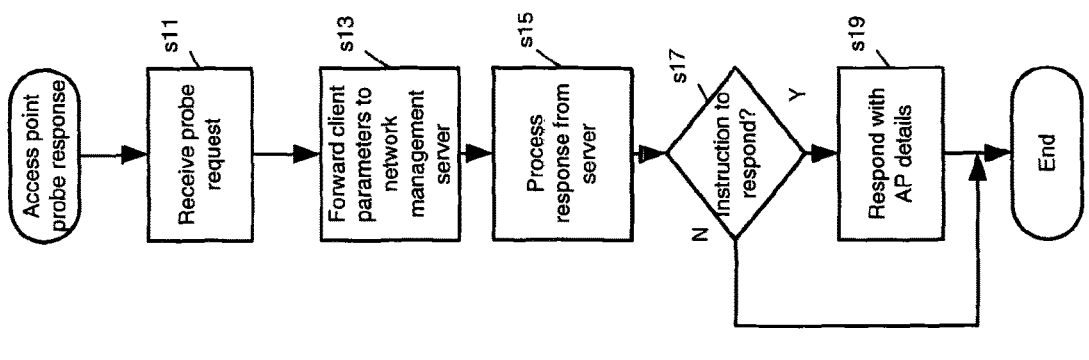
FIG. 10 is a flow chart showing the processing of an access point when a probe response message is received in accordance with the first embodiment.

The processing of the client devices, access points and the network management server will now be described with reference to FIGS. 9, 10 and 11.

Figure 9:
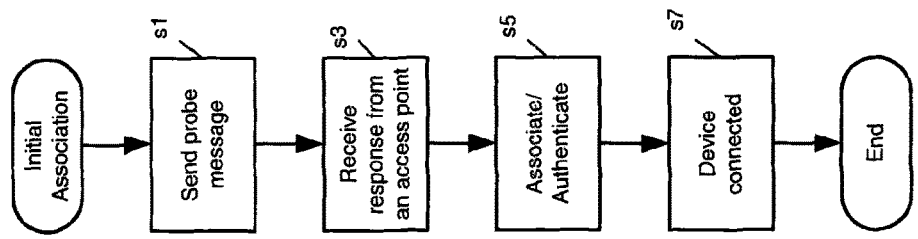
FIG. 9 is a flowchart showing the processing of the client device when connecting to an access point in accordance with the first embodiment.

FIG. 9 is a flowchart showing the operation of the unconnected client device 9. When a client device 9 wishes to connect to a wireless access point 5, in this embodiment it functions in a standard manner. In s1 a probe request is broadcast via a wireless adaptor. Depending on the capabilities of the wireless adaptor, the probe message is transmitted on both the 2.4 GHz and 5 GHz frequency channels.

After the probe message has been sent, in s3 the client device waits until a response is received from an access point. Of course in the case there are no access points nearby the process will time out.

Once a response is received, in s5 the standard association and authentication routines take place, and in s7 the device is connected to a wireless device.

The operation of the access points will now be described with reference to FIG. 10. In s11 the access point 5 receives a probe request. Instead of immediately responding to the probe message, in s13 the access point 5 forwards the probe request and an indication of the signal strength between the client device 9 and the access point 5 to the network management server 11.

In s15 a response is received from the management server. In s17 the access point 5 processes the response. If the response instructs the access point 5 to respond to the probe message, then in s19 the access point 5 responds to the client device 9 in the conventional manner, however, if the instruction is to ignore the probe message, then processing ends without responding to the probe message.

The processing of the management server 11 will now be explained with reference to FIG. 11. In s21 a first message from an access point 5 is received and in response to this event, an entry is created in the database for the new client device 9 noting the client's identity, the identity of the access point and a detected signal strength between the client device and access point. In s23 further access point messages are received, as the messages relate to the same client device, the access point identity and signal strength are added to the client device's entry in the database 57.

After a predetermined amount of time has elapsed, in s25 the management server ranks the access points in accordance with their signal strength. In s27, the highest ranking access point is instructed to respond to the client device's probe message and the client table is update to reflect this instruction. In s29, the other access points are instructed to not respond to the probe request since they will not be chosen by the client device.

FIG. 12 shows a client entry in the database 57. For a given client device 9, the entry stores a number of access point identities, the signal strength and the identity of the selected access point 5.

In this way, only the access point which would have been chosen by the client device 9 responds to the probe request. This processing by the access point and management server reduces the traffic requirements on the wireless network space which is typically of lower capacity than the wired network space.

Second Embodiment

The first embodiment discusses a method of minimizing management traffic for dealing with unconnected clients, in particular that caused by responding to probe requests. The second embodiment describes the behavior of the access points and the management server when dealing with connected client behavior.

Figure 13:
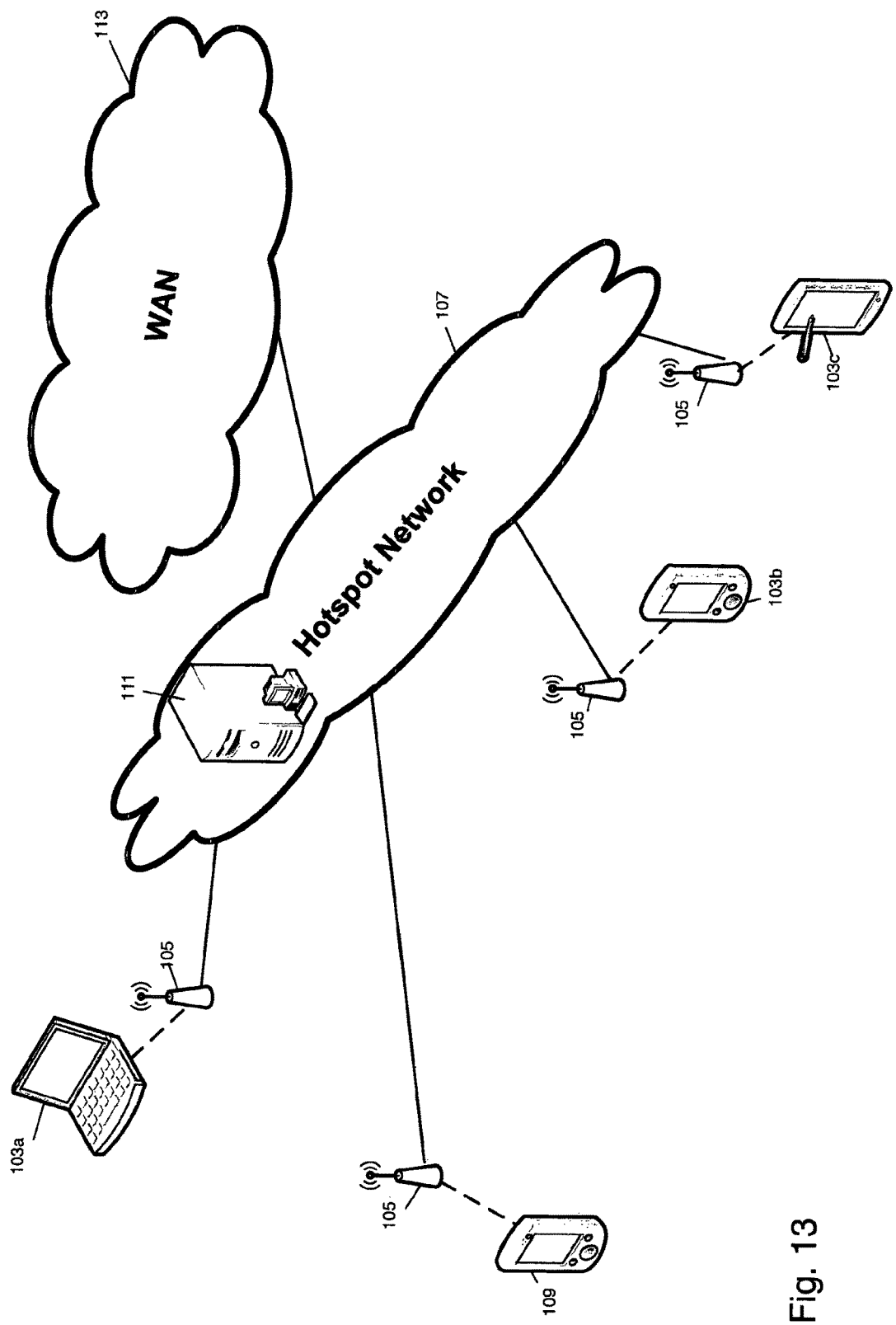
FIG. 13 is a schematic diagram of a wireless network system in accordance with a second embodiment in which a client device is connected to a wireless access point.
Figure 14:
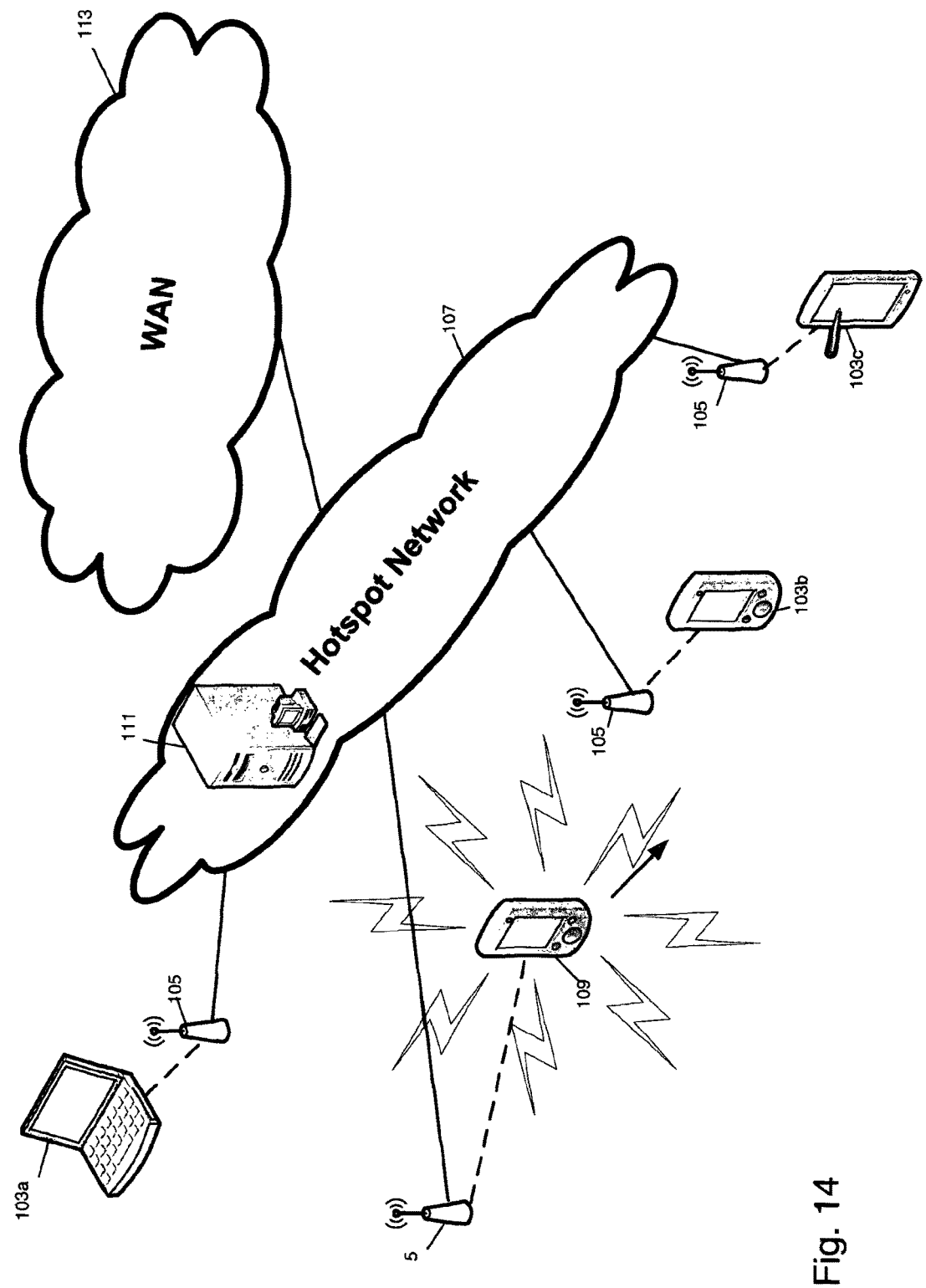
FIG. 14 is a schematic diagram showing the network illustrated in FIG. 13 in which the connected client device has changed location and broadcasts a probe request frame when the signal strength to the connected access point becomes too low.

Typically, when a client device is in a connected (or associated) state with a particular access point, there is little management traffic generated that is not directly related to user data transfers. FIG. 13 shows a client device 109 connected to an access point 105. However, when a connected client device 109 is a mobile device such as a smartphone or tablet computer, if the device moves, the signal strength to the connected access point will change. As shown in FIG. 14, if the client device 109 moves away from the access point 105, then the signal strength will decrease and in order to maintain connectivity to the network 107, the client device 109 may need to find a new access point to perform a handover by broadcasting a probe request.

Different devices generally have different threshold signal strengths for initiating a handover. This may be due to hardware capabilities of the adaptor card or aerial of the client device, a minimum bandwidth or data rate required or a manufacturer defined setting for "roaming aggressiveness."

In the second embodiment, the access points regularly log the signal strength of their connected client devices to determine when a device first sends probe requests as this signal strength is the threshold value for that device. Rather than attempting to send this threshold value to all neighboring access points, this signal strength data is sent to the management server 111 which acts as a central database for the other access points to consult before responding to the client device's probe request. This processing reduces the amount of management traffic which improves the bandwidth available for data transfers.

Having retrieved the threshold value, each access point can determine whether the signal strength is above the threshold and hence decide whether or not to respond to the probe request.

Figure 15:
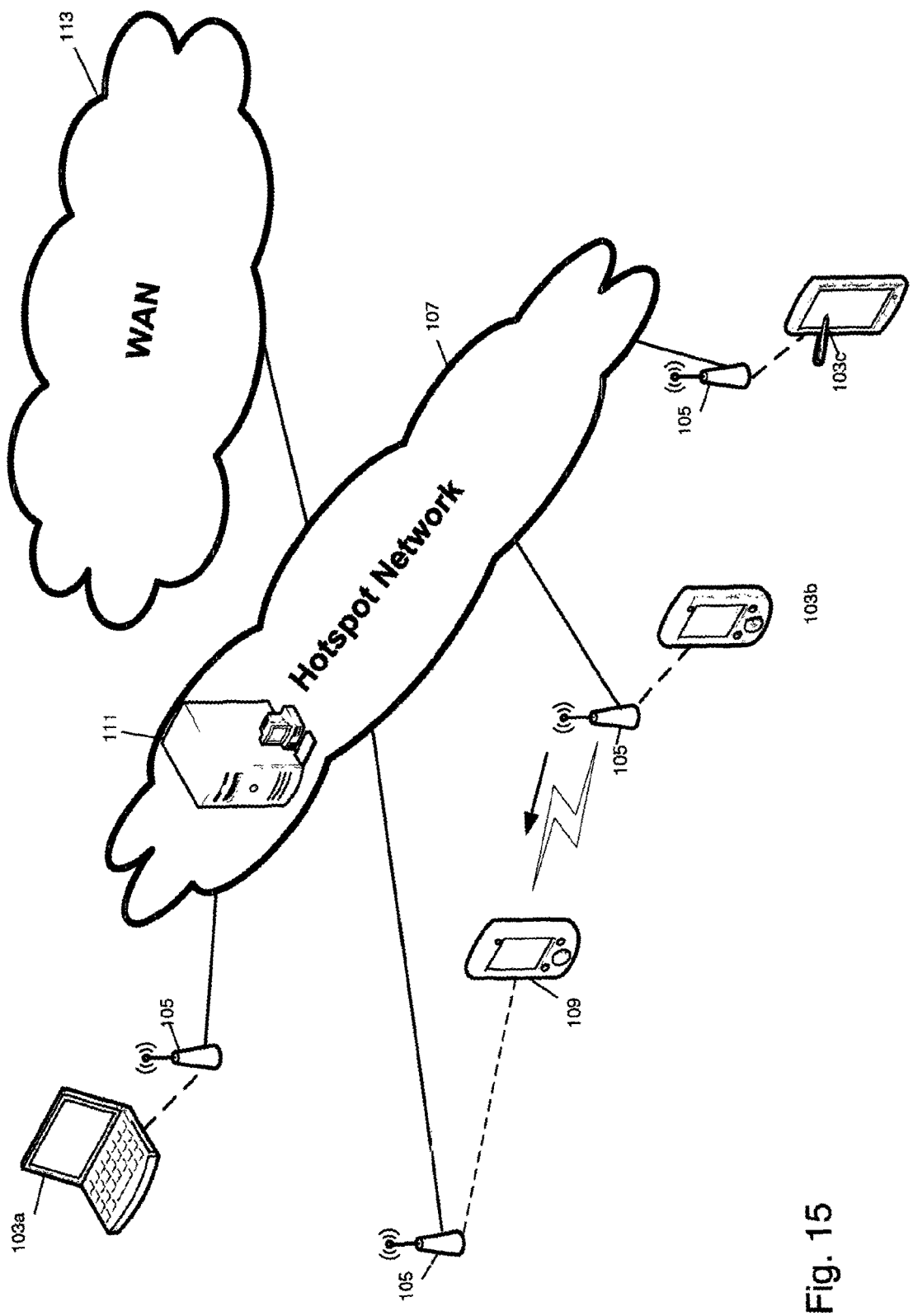
FIG. 15 is a schematic diagram showing the network illustrated in FIG. 14 where a single access point responds to the client device's probe request frame.

As shown in FIG. 15, although there are three other access points 105 able to hear the client device's probe request, after the processing of the access point according to the second embodiment, only one access point 105 having a greater signal strength than the determined threshold replies to the client device's probe request.

Figure 16:
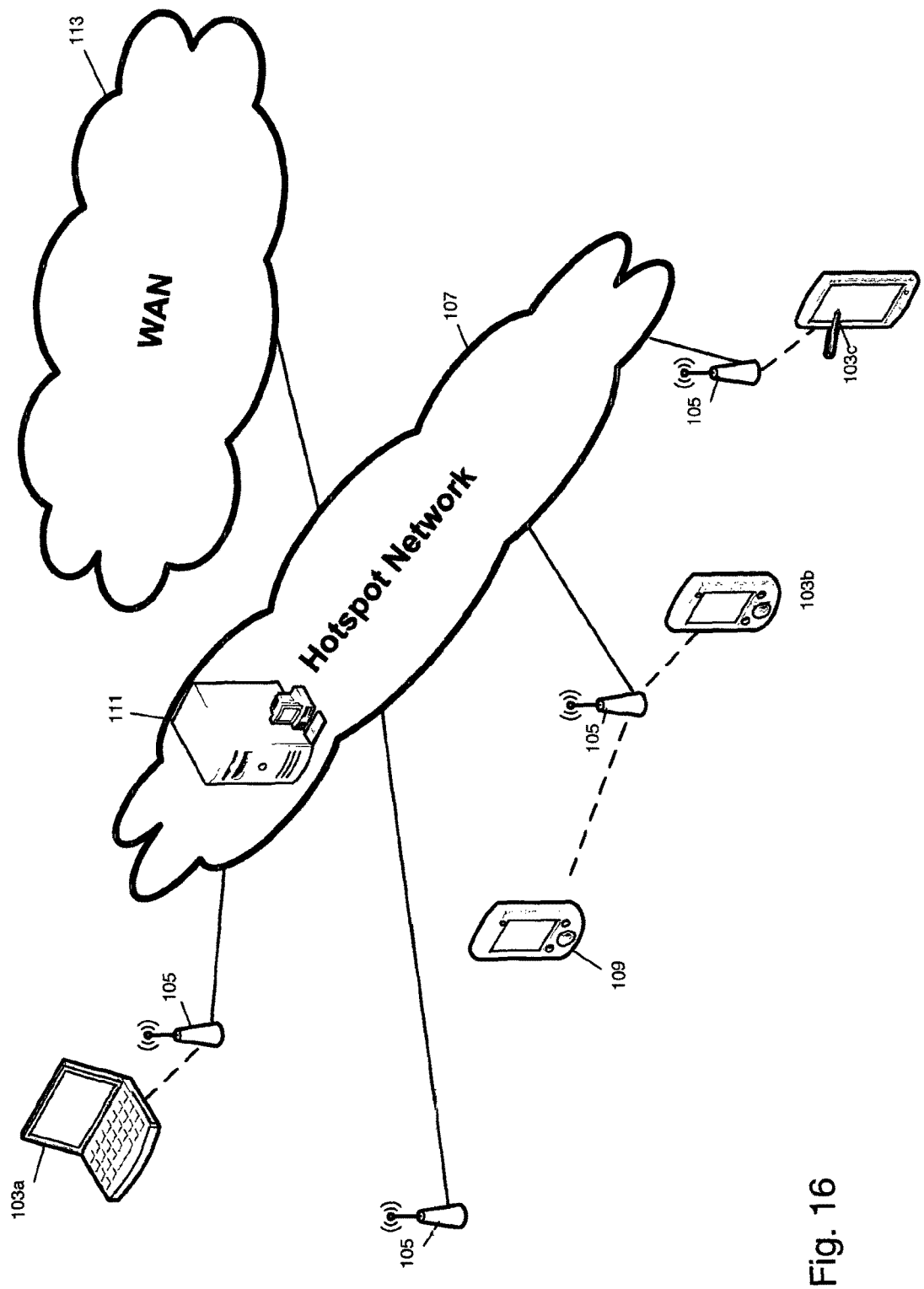
FIG. 16 is a schematic diagram showing the network illustrated in FIG. 15 where the client device has completed a handover process and connected to the responding access point.

The client device 109 processes any probe responses in a conventional manner in order to select a new access point to maintain connectivity. FIG. 16 shows the client device 109 connected to a new access point 105.

Figure 17:
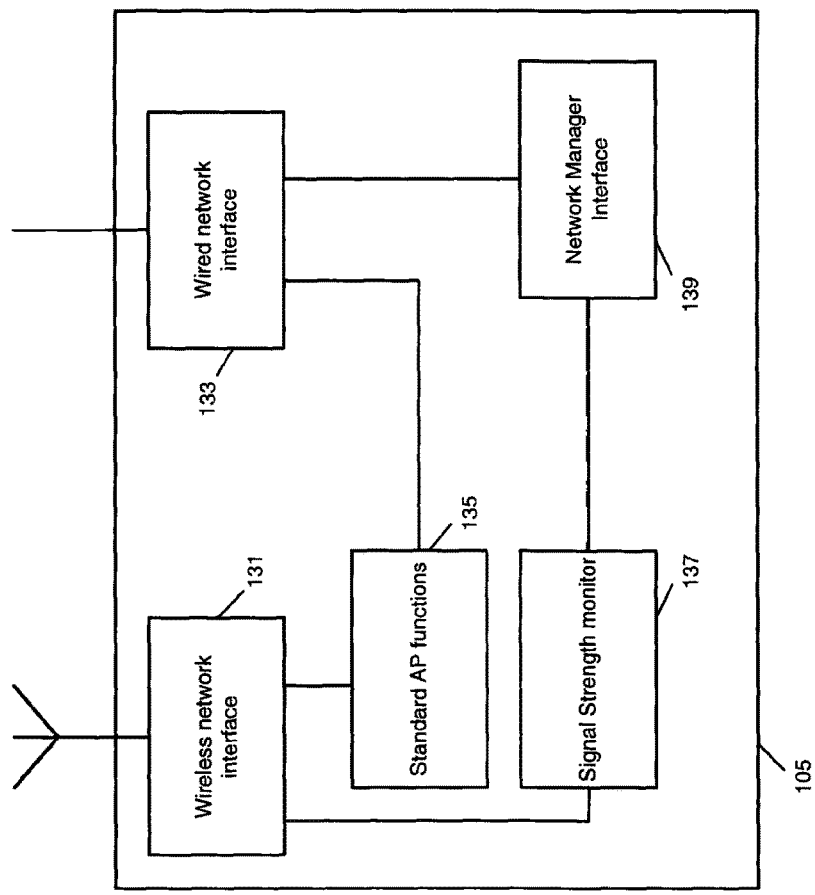
FIG. 17 is a schematic diagram showing the functional components of an access point illustrated in FIGS. 13 to 16.

FIG. 17 is a schematic diagram showing the functional components of an access point 105 in the second embodiment.

The wireless access point 105 includes a wireless network interface 131, a wired network interface 133 and standard access point functions 135 such as routing. Furthermore the access point 105 contains a signal strength monitor 137 and network manager interface 139.

Figure 18:
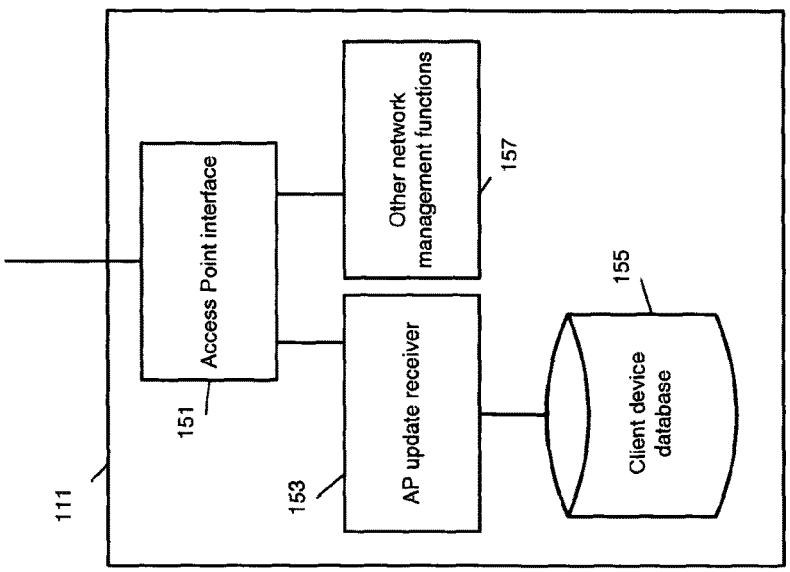
FIG. 18 is a schematic diagram showing the functional components of a management server illustrated in FIGS. 13 to 16.

FIG. 18 is a schematic diagram showing the functional components of a management server 111 in a second embodiment.

The functional units of the management server 111 include an access point interface 151, an access point update receiver 153, a client device database 155 and an interface for other network management functions 157.

FIG. 19 shows the processing of the access point 105 which has a connected client device 109 in the second embodiment.

In s101 the access point 105 is connected to a client device and measures the signal strength between itself and the client device. At s103 a test is performed to see if the connected client device 109 has started sending probe requests, if it has not, then processing returns to s101 so that the access point can continue to monitor the signal strength. The determination of the signal strength of the client is based on received packets. Each packet has a received signal strength at which it was measured. The measurement is an average of packet signal strength over a time frame. In this embodiment the time frame is 100 ms which is the same default interval at which regular AP management traffic is sent.

If the access point finds that the connected client device 109 has started sending probe requests because the signal strength is deteriorating, then in s105 the access point 105 logs the measured signal strength as the threshold signal strength for the connected client 109.

Finally the threshold value is sent as a message to the management server 111 in s107 and processing ends.

FIG. 20 shows the processing performed by the management server 111.

In s111 a threshold message is received from an access point 105, and in s113 the management server 111 updates the client database 155 with this new value and makes it available to other access points 105 in the network 107.

FIG. 21 shows example contents of the client database 155 in the second embodiment. As can be seen, each of the four connected devices has a different threshold signal strength due to variations in the performance and capabilities of the wireless adaptors.

FIG. 22 shows the processing performed by other access points 105 which are candidates for client device 109 handover.

In s121 the access point receives a probe request from a client device. In response the access point determines the signal strength to the client device in s123 and then in s125 consults the management server for the threshold level for the client device.

The retrieved threshold value is then compared to the determined signal strength in s127, and if the signal strength is higher than the threshold, then in s129 the access point responds to the client device's probe request so that it can be considered for the handover. However, if signal strength is lower than the threshold, then in s131 the access point ignores the probe request since it will not be considered for the handover—the client device would not consider handing over to a lower signal strength access point.

In the second embodiment the amount of management traffic transmitted over a wireless network for a handover routine when a client device is reduced because the access points can choose to ignore client device probe requests.

Third Embodiment

In the second embodiment, the access points selectively respond to probe requests by comparing the measured signal strength for a handover client device against a threshold. This reduces the management traffic thereby allowing more data traffic bandwidth for connected clients.

In a further improvement, the functionality of the management server in the first embodiment is applied to the second embodiment to handle client device handover. The connected access point monitors the signal strength to determine a threshold for that particular device and forwards it to the management server.

The operation of other access points and the management server differs from the second embodiment in that the management server is also responsible for selecting the next access point for the client device. The access points which receive the probe request forward them to the management server instead of retrieving the threshold value. The management server then compares each access point's signal strength against the threshold, to filter out unsuitable candidates for handover. Then it ranks the candidate access points and notifies the top ranking access point to reply to the probe request while instructing the other access points to ignore the probe request.

With this operation, the management server can ensure that only access points with higher signal strengths than the threshold to the client are considered as a possible handover candidates. Then the management server reduces the management traffic sent over the wireless networks by deciding which access point handles the handover procedure and sending all signalling over the wired network. The wired network traffic is also reduced due to a decrease in message flows.

Figure 23:
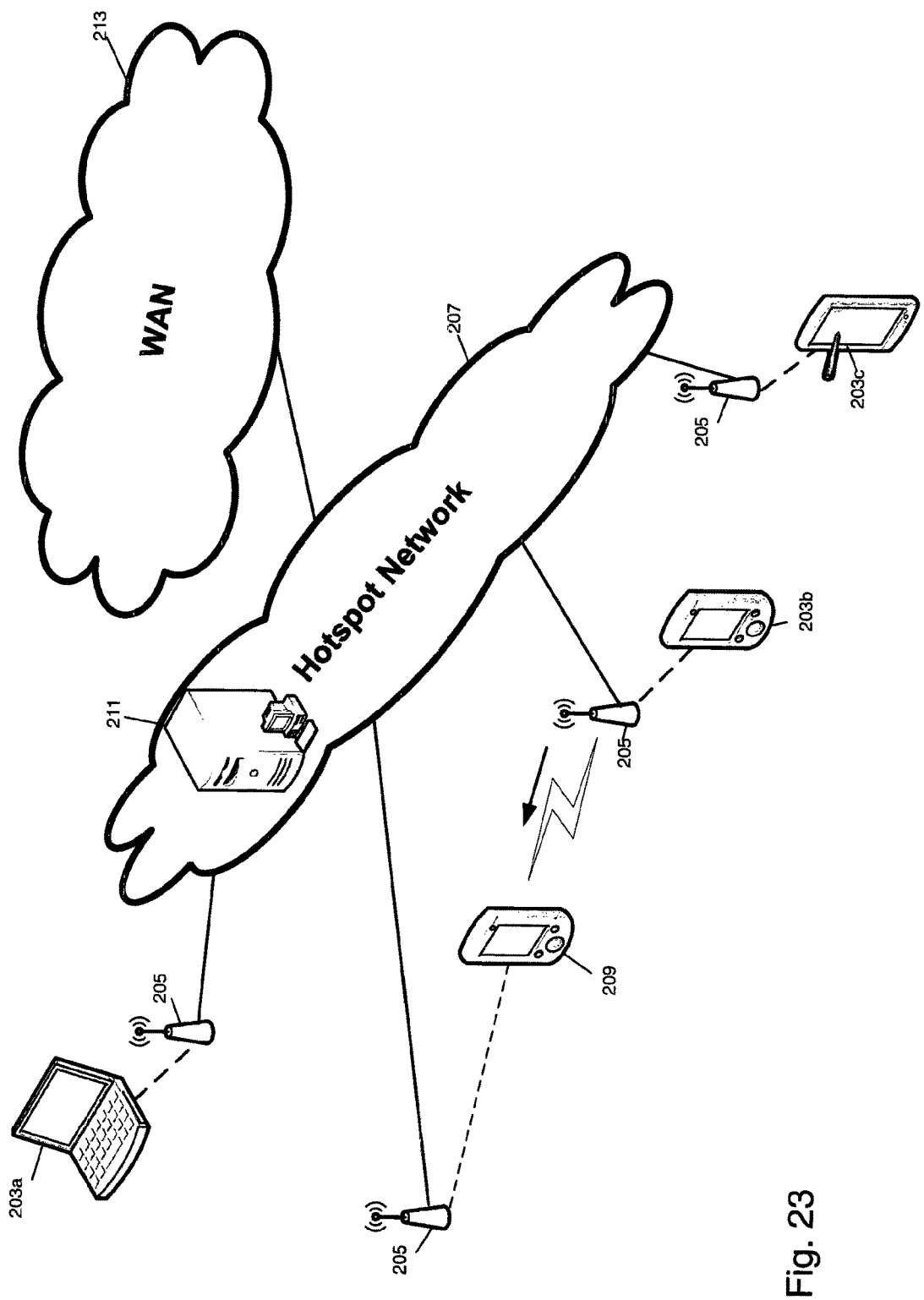
FIG. 23 is a schematic diagram of a wireless network system in accordance with a third embodiment in which a client device is connected to a wireless access point.

FIG. 23 is a schematic diagram of a wireless network system in accordance with a third embodiment of the present invention in which client devices 203 can connect wireless access points 205 within a hotspot network 207 to provide connection to a wide area network such as the Internet 213. Whilst the overall impression is the same as in the second embodiment, the processing of the wireless access points 205 and the interaction with a management server 211 is different. An exemplary client device 209 is shown in a state where it has broadcast for access points 205 and a single access point 205 has replied.

Unlike in the second embodiment, the access points 203 and 209 do not determine for themselves whether access points 205 are suitable. In the third embodiment this functionality is provided by the management server 211.

Compared with the second embodiment, the access points 205 are simpler and the management server 211 is more complex.

Figure 24:
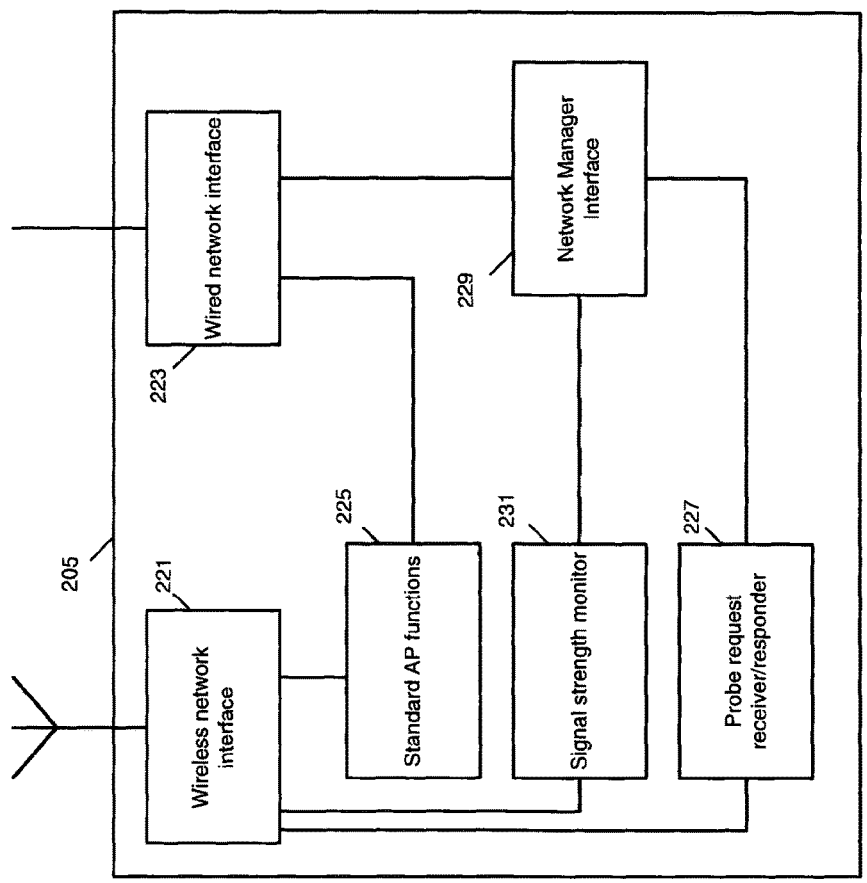
FIG. 24 is a schematic diagram showing the functional components of an access point illustrated in FIG. 23.

FIG. 24 is a schematic diagram showing the functional components of an access point 205 illustrated in FIG. 23.

The wireless access point 205 includes a wireless network interface 221, a wired network interface 223 and standard access point functions 225 such as routing. Furthermore the access point 5 contains a modified probe request receiver and responder 227 and network manager interface 229 as per the first embodiment and a signal strength monitor 231 as in the second embodiment. The operation of these further functions allows for a reduction in the volume of control data transmitted across the wireless network interface and will be explained in more detail later.

Figure 25:
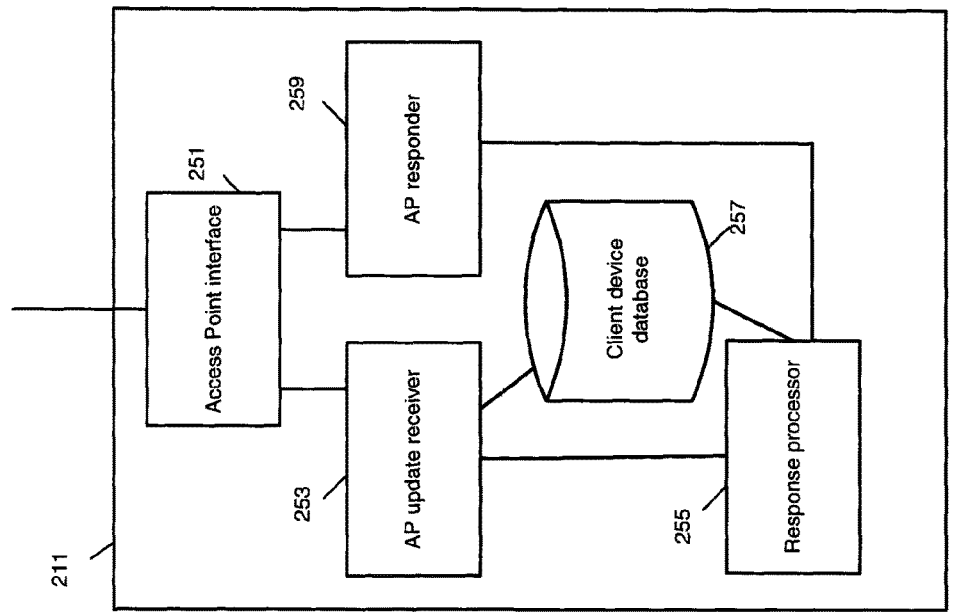
FIG. 25 is a schematic diagram showing the functional components of a management server illustrated in FIG. 23.

FIG. 25 is a schematic diagram showing the functional components of a management server 211 illustrated in FIG. 23.

The functional units of the management server 7 include an access point interface 251, an access point update receiver 253, a response processor 255, a client device database 257 and an access point responder 259.

Figure 26:
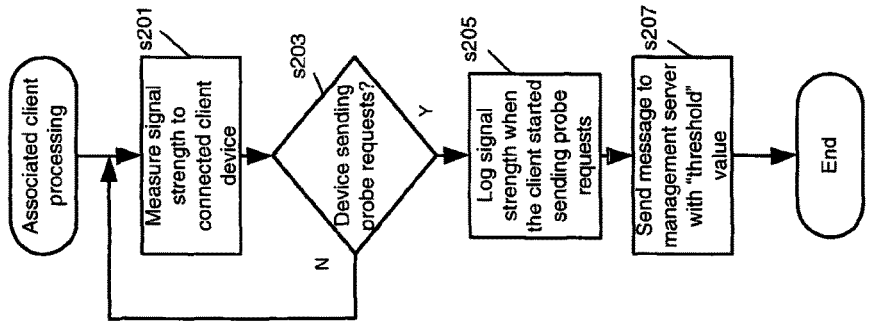
FIG. 26 is a flowchart showing the processing of the access point currently connected to the client device before handover in the third embodiment.

FIG. 26 is a flowchart showing the processing of the access point currently connected to the client device before handover.

In s201 the access point is connected to a client device and measures the signal strength between itself and the client device. At s203 a test is performed to see if the connected client device has started sending probe requests, if it has not, then processing returns to s201 so that the access point can continue to monitor the signal strength. The determination of the signal strength of the client is based on received packets. Each packet has a received signal strength at which it was measured. The measurement is an average of packet signal strength over a time frame. In this embodiment the time frame is 100 ms which is the same default interval at which regular AP management traffic is sent.

If the access point finds that the connected client device has started sending probe requests because the signal strength is deteriorating, then in s205 the access point logs the measured signal strength as the threshold signal strength for the connected client.

Finally the threshold value is sent as a message to the management server 211 in s207 and processing ends.

Figure 27:
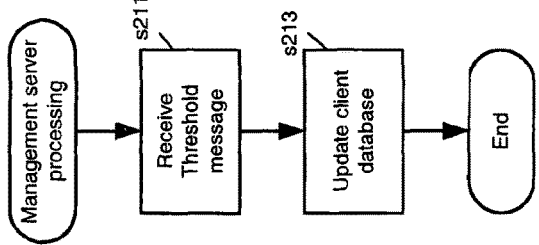
FIG. 27 is a flowchart showing the processing of the management server upon receipt of a threshold signal from an access point in the third embodiment.

FIG. 27 is a flowchart showing the processing of the management server upon receipt of a threshold signal from an access point;

In s211 a threshold message is received from an access point, and in s213 the management server updates the client database with this new value and makes it available to other access points in the network.

Figure 28:
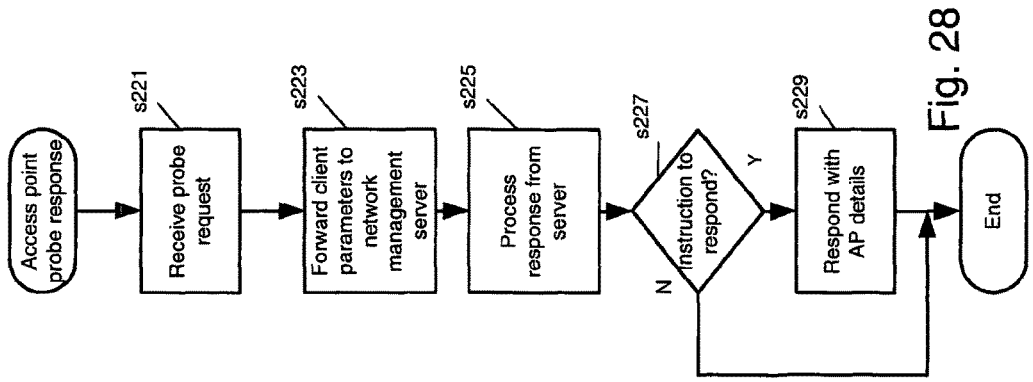
FIG. 28 is a flow chart showing the processing of an access point when a probe response message is received in the third embodiment.

FIG. 28 is a flow chart showing the processing of an access point when a probe response message is received.

In s221 the access point receives a probe request and instead of immediately responding to the probe message, in s223 the access point forwards the probe request and an indication of the signal strength between the client device and the access point to the network management server 211.

In s225 a response is received from the management server 211. In s227 the access point 205 processes the response. If the response instructs the access point 205 to respond to the probe message, then in s229 the access point responds to the client device in the conventional manner, however, if the instruction is to ignore the probe message, then processing ends without responding to the probe message.

Figure 29:
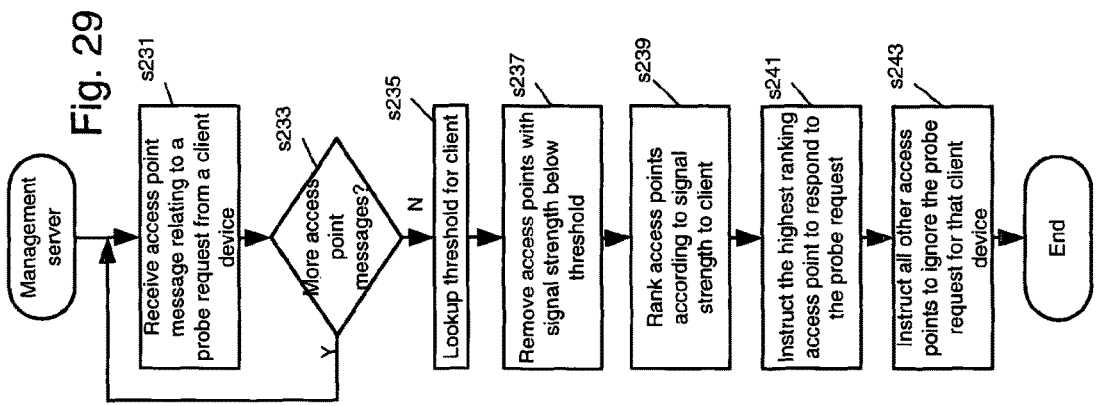
FIG. 29 is a flowchart showing the processing of the management server when an access point reports a client device probe request frame in the third embodiment.

FIG. 29 is a flowchart showing the processing of the management server 211 when an access point 205 reports a client device probe request frame.

In s231 a first message from an access point is received and in response to this event, an entry is created in the database for the new client device noting the client's identity, the identity of the access point and a detected signal strength between the client device and access point. In s233 further access point messages are received, as the messages relate to the same client device, the access point identity and signal strength are added to the client device's entry in the database.

After a predetermined amount of time has elapsed, in s235 the management server 211 retrieves the threshold signal for the client device 209. It then compares each received access point message against the threshold, and in s237 removes any signals which are below the threshold for the device since the client device will not connect to any devices with a lower strength. After this initial cull, in s239 the management server ranks the access points in accordance with their signal strength. In s241, the highest ranking access point is instructed to respond to the client device's probe message and the client table is updated to reflect this instruction. In s243, the other access points are instructed to not respond to the probe request since they will not be chosen by the client device.

In the third embodiment, the amount of wireless management data during handover can be reduced because the management server 211 first filters out weak signals and then finds the strongest access point for a client device. Most of the communications are over conventional fixed line networks so this removes a source of interference and traffic from the wireless network.

Alternatives and Modifications

In the first embodiment, unconnected client devices can join a wireless network after the processing of the access points and management server selects the most suitable access point. If the unconnected client device has been previously connected to the network then it will have an entry in the management server and in particular it may have a threshold value. Therefore, in an alternative, the management server includes an addition action of comparing each received message from the access points against the threshold to pre-filter and reduce the list of access points that need to be ranked.

In the above embodiments, the example systems assume that the client device can connect to any of the available access points and therefore the access point simply connects to the strongest signal access point at any given moment in time. Such a scenario is common in hotspot networks in which the access point low level security is often disabled since the security aspects of the network are addressed at a much higher network level.

However, it is more common that the access points are secured access points requiring authentication using a protocol such as Wi-Fi Protected Access version 2 (WPA2), and therefore if the wireless client does not have the authentication key, then even if the access point provides the strongest signal strength the client will not be able to connect.

In a modification to the above embodiments, the management server maintains a list of each client's preferred networks and ensures that the preferred networks are instructed to respond in preference to other stronger but protected networks which the client device will not be able to connect to.

In some of the embodiments, the management server is arranged to select the access point having the strongest signal strength, whilst other access points are instructed to ignore the probe request. This behavior minimizes the amount of management traffic on the network.

In an alternative to the behavior of the management server in the first and third embodiments, the management server is configured to instruct more than one of the top ranking access points, e.g. the top two access points to respond to the probe request. The client then makes the final decision regarding which access point it connects to based on local criteria. This is especially important for mobile client devices which will be moving and therefore the signal strengths may have changed from the sending of the requests to the actual association. In any case, weak signals which the client would never connect to are filtered out. E.g. all those with a signal strength below −70 dBm. The threshold value could be obtained from the connected client behavior when it starts to hunt for a new AP.

In the embodiments, the access points send their measured signal strength to the management server which then ranks the access points. However, other criteria in addition to the signal strength may be utilized. In an alternative, the access points send other metrics in addition to signal strength so the management server can use different selection criteria to determine "best" access point, e.g., present load so closest AP might not be the best one. Such metrics such as network load, interference etc., can be obtained from the ratified IEEE 802.11k standard.

In the embodiments, the access points forward probe requests, however, it will be appreciated by those skilled in the art that only the information and parameters are important. Therefore the access points could also send probe request summary messages in an alternative.

In a further modification, the management server can be used for access control by preventing specific sets of access points or even all access points from responding to the probe requests issuing from a particular set of client devices.

Additional Implementation Details

The systems and methods of the above embodiments may be implemented in a computer system (in particular in computer hardware or in computer software or a combination of both) in addition or as an alternative to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Alternatively, a microprocessor, plural microprocessors, microcontroller, plural microcontrollers, ASIC and/or FPGA may be employed. The computer system may have a monitor to provide a visual output display. The data storage may comprise RAM, hard disk drive (HDD) or other computer readable media, including portable media and optical media. The computer system may include a plurality of computing devices connected by a network and able to communicate with each other over that network.

The methods of the above embodiments may be provided as computer programs or as computer program products or computer-readable media carrying a computer program which is arranged, when run/executed on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

It will be appreciated that the above described embodiments are purely illustrative and are not limiting on the scope of the claims. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method of performing device handover in a wireless local area network (WLAN) access network having a plurality of WLAN access points for providing connectivity to a plurality of mobile devices, wherein each mobile device is operable to connect to different ones of the WLAN access points in dependence on each mobile device location within the WLAN access network, the WLAN access points being connected to a management server for exchange of control data between sets of WLAN access points in relation to the mobile devices, the method comprising:

by a first WLAN access point having a connected mobile device:
  monitoring for probe requests issued by the connected mobile device, indicative that the connected mobile device is seeking to handover to another of the plurality of WLAN access points,
determining a signal strength of a wireless link between the first WLAN access point and the connected mobile device, and
without the first WLAN access point having responded to the probe request, sending a message to the management server, the message containing the determined signal strength and an identifier for the connected mobile device;
by the management server:
receiving the message from the first WLAN access point, and
storing the identifier for the mobile device and the determined signal strength in a data store, wherein the determined signal strength is stored as a threshold signal strength for handover for that mobile device;
by at least one second WLAN access point:
receiving a probe request from said connected mobile device,
determining an observed signal strength between the second WLAN access point and the connected mobile device, and
without the second WLAN access point having responded to the probe request, sending a second message to the management server, the second message including details of the probe request, the identifier for the connected mobile device and the observed signal strength between the second WLAN access point and the connected mobile device; and
wherein the management server further performs the following:
receiving the second message from the at least one second WLAN access point,
retrieving the threshold signal strength associated with the connected mobile device from the data store,
determining whether the observed signal strength between the at least one second WLAN access point and the connected mobile device is above the stored threshold signal strength associated with said connected mobile device, and
wherein the management server is configured to control operation of the second WLAN access point according to the following:
if the observed signal strength is above the threshold signal strength, the management server instructing the second WLAN access point to respond to the probe request, and
if the observed signal strength is below the threshold signal strength, the management server instructing the second WLAN access point to ignore the probe request, thereby preventing the second WLAN access point from responding to the probe request.

2. The method according to claim 1, further comprising, by the management server:
receiving messages from a plurality of second WLAN access points in the network;
comparing each of the second WLAN access points against the stored threshold signal strength associated with the connected mobile device; and
instructing a subset from the plurality of second WLAN access points to respond to the probe request of the connected mobile device.

3. The method according to claim 1, further comprising determining access permissions and a network load of the at least one second WLAN access point.

4. A method of operating a management device in a hotspot network having a plurality of WLAN access points and a plurality of mobile devices in device handover, comprising:
receiving, from a first WLAN access point connected to a mobile device, a message containing a signal strength value of a wireless link between the first WLAN access point and the mobile device when the mobile device issued connection requests for handover and an identifier for the mobile device;
storing the identifier for the mobile device and the signal strength in a data store, wherein the signal strength is stored as a threshold signal strength for handover associated with that mobile device,
receiving, from at least one second WLAN access point that has received a probe request from the mobile device, prior to the at least one second WLAN access point responding to the probe request, a second message, including details of the probe request, the identifier for the mobile device and an observed signal strength,
retrieving the threshold signal strength associated with the mobile device from the data store;
determining whether the observed signal strength between the second WLAN access point and the mobile device is above the threshold signal strength for the mobile device; and
wherein the management server is configured to control operation of the second WLAN access point according to the following:
if the observed signal strength is above the threshold signal strength, the management server instructs the second wireless access point to respond to the probe request, and
if the observed signal strength is below the threshold signal strength, the management server instructs the second wireless access point to ignore the probe request, thereby preventing the second WLAN access point from responding to the probe request.

5. A non-transitory, computer readable storage medium storing a computer program comprising instructions that, when executed by a management device in a network, control the network to perform the method of claim 4.

6. The method according to claim 4, further comprising:
receiving messages from a plurality of second WLAN access points in the network;
comparing each of the second WLAN access points against the threshold signal strength associated with the mobile device; and
instructing a subset from the plurality of second WLAN access points to respond to the probe request.

7. The method according to claim 4, further comprising determining access permissions and a network load of the at least one second WLAN access point.

8. A WLAN access network having a plurality of WLAN access points for providing connectivity to a plurality of mobile devices, wherein each mobile device is operable to connect to different ones of the WLAN access points in dependence on each mobile device location within the WLAN access network, the WLAN access points being connected to a management server for exchange of control data between sets of WLAN access points in relation to the mobile devices, comprising:

a first WLAN access point having a connected mobile device and comprising:
    a probe monitor for monitoring for probe requests issued by the connected mobile device, indicative that the connected mobile device is seeking to handover to another of the plurality of WLAN access points,
    a signal measurer for determining a determined signal strength of a wireless link between the first wireless access point and the connected mobile device, and
    a data sender for sending a message to the management server prior to responding to a probe request, the message containing the determined signal strength and an identifier for the connected mobile device,
the management server comprising:
    a receiver for receiving the message from the first WLAN access point, and
    a data store for storing the identifier for the connected mobile device and the determined signal strength in a data store, wherein the determined signal strength is stored as a threshold signal strength for handover for that mobile device;
at least one second WLAN access point comprising:
    a receiver for receiving a probe request from the connected mobile device, and
    a sender for sending a second message to the management server prior to responding to the probe request, the second message including details of the probe request, the identifier for the connected mobile device and an observed signal strength,
wherein the management server is operable to receive the second message from the at least one second wireless access point; and
further comprising a controller operable to:
    retrieve the threshold signal strength associated with the connected mobile device from the data store,
    determine whether the observed signal strength between the at least one second wireless access point and the connected mobile device is above the stored threshold signal strength associated with the connected mobile device, and
    wherein the management server is configured to control operation of the second WLAN access point according to the following:
        if the observed signal strength is above the threshold signal strength to instruct the second wireless access point to respond to the probe request, and
        if the observed signal strength is below the threshold signal strength, instruct the second wireless access point to ignore the probe request, thereby preventing the second WLAN access point from responding to the probe request.

9. The method according to claim 8, wherein the management server is further operable to:
    receive messages from a plurality of second access points in the network;
    compare each of the second access points against the stored threshold signal strength associated with the connected mobile device; and
    instruct a subset from the plurality of second wireless access points to respond to the probe request of the connected mobile device.

10. A method according to claim 8, wherein the controller is operable to determine access permissions and a network load of the at least one second WLAN access point.

11. A management server for managing device handover in a network having a plurality of WLAN access points and a plurality of mobile devices, comprising:
    a receiver for receiving, from a first WLAN access point connected to a mobile device, a message containing a signal strength value of a wireless link between the first WLAN access point and the mobile device when the mobile device issued connection requests for handover and an identifier for the mobile device;
    a data store for storing the identifier for the mobile device and the signal strength in a data store, wherein the signal strength is stored as a threshold signal strength for handover associated with that mobile device,
wherein the receiver is further operable to receive, from at least one second WLAN access point that has received a probe request from the mobile wireless communication device, a second message including details of the probe request, an identifier for the mobile device and an observed signal strength, wherein the second message is received prior to the at least one second WLAN access point responding to the probe request;
further comprising:
    a controller operable to:
        retrieve the threshold signal strength associated with the mobile device from the data store;
        determine whether the observed signal strength between the second WLAN access point and the mobile device is above the threshold signal strength for the mobile device; and
        control operation of the second WLAN access point according to the following:
            if the observed signal strength is above the threshold signal strength to instruct the second wireless access point to respond to the probe request, and
            if the observed signal strength is below the threshold signal strength, instruct the second wireless access point to ignore the probe request, thereby preventing the second WLAN access point from responding to the probe request.

12. The management server according to claim 11, further operable to:
    receive messages from a plurality of second WLAN access points in the network;
    compare each of the second WLAN access points against the threshold signal strength associated with the mobile device; and
    instruct a subset from the plurality of second WLAN access points to respond to the probe request of the mobile device.

13. The management server according to claim 11, wherein the controller is further operable to access permissions and a network load information of the at least one second WLAN access point.

* * * * *